United States Patent [19]

Ponnappan et al.

[11] Patent Number: 5,629,573
[45] Date of Patent: May 13, 1997

[54] SPRAY COOLED CONDENSER FOR AN INTEGRAL HEAT PIPE SHAFT IN HIGH POWER MOTORS AND GENERATORS

[75] Inventors: Rengasamy Ponnappan, Centerville; Jerry E. Beam, Beavercreek; John E. Leland, Kettering, all of Ohio

[73] Assignee: The United States of America as represented by the Secretary of the Air Force, Washington, D.C.

[21] Appl. No.: 540,603

[22] Filed: Oct. 3, 1995

[51] Int. Cl.$^6$ .................................................. H02K 9/00
[52] U.S. Cl. ........................................... 310/64; 310/54
[58] Field of Search ................................. 310/64, 54, 55, 310/56, 57, 58, 59, 60 A, 60 R, 61, 62, 63, 113, 214

[56] References Cited

U.S. PATENT DOCUMENTS

| | | | |
|---|---|---|---|
| 3,576,143 | 4/1971 | Baits | 74/687 |
| 3,914,630 | 10/1975 | Lloyd et al. | 310/61 |
| 4,240,000 | 12/1980 | Harano et al. | 310/54 |
| 4,728,840 | 3/1988 | Newhouse | 310/113 |
| 5,196,746 | 3/1993 | McCabria | 310/54 |
| 5,240,069 | 8/1993 | Yerkes | 165/86 |
| 5,283,488 | 2/1994 | Ponnappan et al. | 310/55 |

OTHER PUBLICATIONS

Ponnappan et al., Thermal Management Issues of Rotors in Rotating Electrical Machines, SAE Technical Paper 942184, Aerotech '94, Los Angeles, CA, Oct. 3–6, 1994.

*Primary Examiner*—Clayton E. LaBalle
*Assistant Examiner*—Timothy A. J. Williams
*Attorney, Agent, or Firm*—Fredric L. Sinder; Thomas L. Kundert

[57] ABSTRACT

A new system for removing heat energy from the rotor of a rotating electrical machine is disclosed. Rotating electrical machines include electric motors, electric generators and the like. The cooling system includes the prior art components of an integral heat pipe rotor shaft, that is, a hollow rotor shaft in which an inner cavity is filled with a suitable working fluid to make an integral heat pipe for removing heat from the rotor. The heat pipe includes an evaporator section inside the rotor and a condenser section extending outside the rotor and the electrical machine housing. The present invention adds a spray chamber surrounding the condenser section. The spray chamber is integrated with the electrical machine housing. Liquid coolant enters the spray chamber and is sprayed through nozzles onto the condenser section to remove the heat transferred from the rotor. The liquid coolant may be routed through a preheater before entering the spray chamber.

3 Claims, 1 Drawing Sheet

५,६२९,५७३

SPRAY COOLED CONDENSER FOR AN INTEGRAL HEAT PIPE SHAFT IN HIGH POWER MOTORS AND GENERATORS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to cooling systems for rotating electrical machines, and more specifically to a rotating heat pipe for removing heat energy from the rotor of an electric motor, an electric generator or the like.

Electrical systems in military and commercial aircraft typically include electric motors and generators having permanent magnet rotors which generate large amounts of heat during operation. Present methods for cooling the rotors include convective air (generally bleed air from the aircraft engine compressor) and oil circulation through a passageway inside the rotor shaft, neither of which are optimum solutions. Air is not effective as a coolant because of its poor heat transfer and low heat capacity. Plus, using bleed air may reduce overall engine performance. Oil circulation causes viscous frictional losses.

The prior art has investigated using rotating heat pipes to transport heat out of high speed rotating machines. In this concept, a rotating heat pipe is made an integral part of a rotor shaft. The rotor shaft is made hollow, filled with a suitable working fluid and sealed. During rotation, the fluid is uniformly distributed over the inner wall of the shaft. Heat is transferred from the rotor through the outer wall of an evaporator section of the rotor shaft to vaporize the fluid inside the rotor shaft. Pushed by the vapor pressure of the vaporized fluid, the vapor flows to a colder condenser section of the shaft away from the rotor and condenses on the tapered inside wall of the condenser section. The centrifugal force from the rotating shaft causes the condensate to flow along a tapered inner wall back to the evaporator section in thermal contact with the rotor, thus completing the heat transport cycle. U.S. Pat. No. 5,283,488 to two of the present inventors introduced the rotofin concept as an improvement to the basic integral heat pipe rotor shaft concept to better acquire the heat energy in the rotor and transfer it to the rotating heat pipe. As just described, the rotating heat pipe will then transfer the acquired heat energy from its evaporator section in thermal contact with the rotor to its condenser section. The last remaining problem is to remove the heat from the condenser section.

Thus it is seen that there is a need for a system for removing heat energy from the condenser section of a rotating heat pipe which is an integral part of the rotor shaft of a high speed electric motor or generator.

It is, therefore, a principal object of the present invention to provide a system for removing heat energy from the condenser section of an integral heat pipe rotor shaft of a high speed electric machine such as an electric motor or generator.

It is a feature of the present invention that it provides a very compact integrated system for removing heat from the rotor of a high speed, high power rotating electrical machine.

It is an advantage of the present invention that it can safely use as a liquid coolant any liquid located near the mounting location of the electrical machine. For example, it can safely use aircraft jet fuel without risk of igniting the jet fuel.

It is another advantage of the present invention that air cooling would require 1000 times the volume of a liquid coolant to remove the same amount of heat from the condenser section of an integral heat pipe rotor shaft.

It is a further advantage of the present invention that it permits a far greater volume of liquid coolant to be used for cooling the rotor of an electrical machine than is possible by direct cooling of the rotor with a liquid coolant.

These and other objects, features and advantages of the present invention will become apparent as the description of certain representative embodiments proceeds.

SUMMARY OF THE INVENTION

The present invention provides a new system for removing heat energy from the condenser section of an integral heat pipe rotor shaft of a high speed, high power rotating electrical machine. The breakthrough discovery of the present invention is a new combination of an integral heat pipe rotor shaft having a condenser section extending outside the rotor into a sealed spray chamber inside which a liquid coolant sprays over the condenser section to absorb heat energy from the condenser section and which coolant is then removed from the sealed spray chamber. The spray chamber is integrated with the electrical machine housing and provides a very compact unit. Another discovery of the present invention is that jet fuel can safely be used as the liquid coolant.

Accordingly, the present invention is directed to a cooling apparatus for a rotating electrical machine having a housing, comprising a rotor inside the housing, a rotor shaft extending through the rotor, wherein the rotor shaft includes an integral rotating heat pipe having a generally cylindrically shaped internal vapor cavity, an evaporator section inside the rotor and a condenser section extending outside the rotor and housing, a vaporizable liquid disposed inside the vapor cavity, a sealed chamber surrounding the condenser section, an inlet to the sealed chamber for receiving liquid coolant, attached to the inlet on the inside of the sealed chamber, at least one spray nozzle for spraying liquid coolant onto the condenser end and an outlet from the sealed chamber for removing liquid coolant from the sealed chamber. The sealed chamber may be partially formed by the outside of the electrical machine housing to become an integral part of the housing. The cooling apparatus may include a preheater for preheating liquid coolant before it enters the inlet to the sealed chamber. The cooling apparatus may also include a supply of liquid coolant wherein the liquid coolant is jet fuel.

BRIEF DESCRIPTION OF THE DRAWINGS

The present invention will be more clearly understood from a reading of the following detailed description in conjunction with the accompanying drawing wherein.

DETAILED DESCRIPTION

Figure 1:
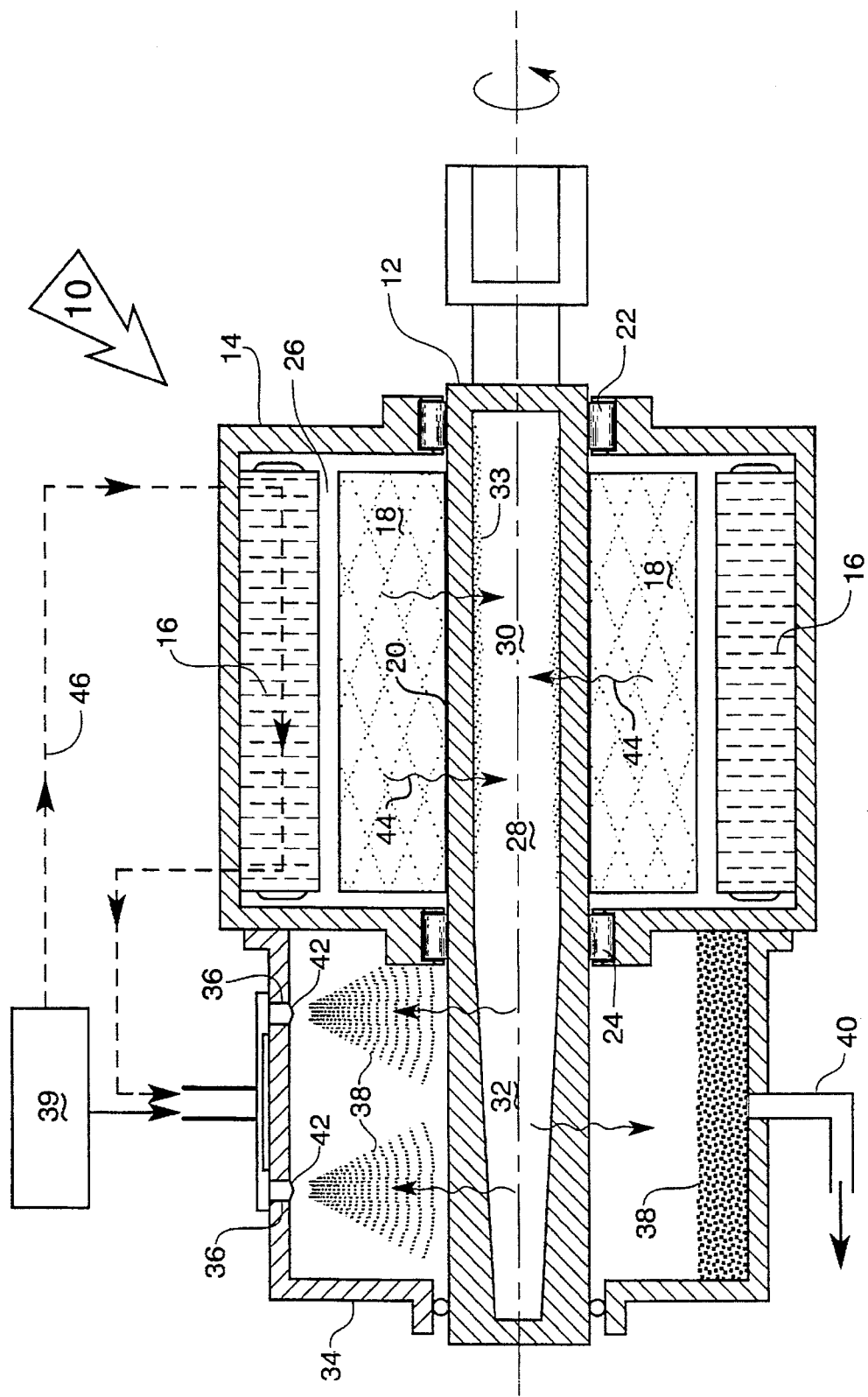
FIG. 1 is an axial sectional view of an integral heat pipe rotor shaft and associated cooling apparatus made according to the teachings of the present invention.

Referring now to the drawings, FIG. 1 shows an axial sectional view of a high speed, high power rotating electrical machine 10, such as an electric motor or generator, incorporating an integral heat pipe rotor shaft 12. Electrical machine 10 includes a housing 14, a stator 16 and a rotor 18. Rotor 18 is attached to integral heat pipe rotor shaft 12 by an interference fit 20 between them. Integral heat pipe rotor shaft 12 rotates inside bearings 22 and 24. Rotor 18 is separated from stator 16 by an air gap 26.

Integral heat pipe rotor shaft 12 includes an internal vapor cavity 28 having a supply of working fluid 33, an evaporator section 30 and a condenser section 32. Condenser section 32 extends outside housing 14. A spray chamber 34 surrounds condenser section 32. Spray chamber 34, in this embodiment, is partially formed by the outer wall of housing 14. Spray chamber 34 is sealed by a combination of conventional wall-to-wall seals and rotary seals where shaft 12 extends through it. Spray chamber 34 includes one or more inlets 36 for supplying a liquid coolant 38 from a supply 39 to the inside of spray chamber 34 and an outlet 40 for removing liquid coolant 38 from inside spray chamber 34. One or more spray nozzles 42 are attached to inlets 36.

During operation of electrical machine 10, substantial heat, or heat energy, 44 is generated inside rotor 18. Heat 44 travels by conduction through interference fit 20 and through the outer walls of the evaporator section 30 of integral heat pipe rotor shaft 12 where it vaporizes liquid working fluid 33. The gas pressure of the vapor pushes it into condenser section 32 where it condenses on the inside walls, giving up the heat energy it absorbed during vaporization. Condensed liquid working fluid 33 is moved by centrifugal force along the tapered inner walls of condenser section 32 back to evaporator section 30 where the heat transfer process starts over again.

Liquid coolant 38 enters inlet 36 and is sprayed onto condenser section 32 through spray nozzles 42. The heat energy absorbed by condenser section 52 in condensing vaporized working fluid 33 is absorbed by liquid coolant 38 which is then removed through outlet 40.

Liquid coolant 38 can be supplied from any of a variety of sources, preferably a source of liquid located close to the electrical machine. For example, on an jet aircraft, jet fuel will typically be available for use as a liquid coolant. Jet fuel used as a coolant has the further advantage that, because it will be soon used as a fuel anyway, it does not need to be recycled through a heat exchanger to remove the heat it absorbed from condenser section 32. For maximum efficiency, that is, maximum heat flux and heat transfer, liquid coolant 38 should be preheated. Path 46 shows an alternative path from liquid coolant supply 39 through stator 16, then to inlets 36, to preheat the liquid coolant.

Another description of aspects of the present invention may be found in R. Ponnappan et al., "Thermal Management Issues of Rotors in Rotating Electrical Machines," SAE Technical Paper 942184, Aerotech 94, Los Angeles, Calif., Oct. 3–6, 1994, which is incorporated by reference into this Detailed Description.

The disclosed cooling system successfully demonstrates improving the heat removal ability of an integral heat pipe rotor shaft by utilizing a separate spray chamber that both maximizes the volume of liquid coolant that can be used to cool the rotor and maximizes the benefits of the two-phase heat transfer operation of a heat pipe. Although the disclosed cooling system is specialized, its teachings will find application in other areas where very high cooling requirements exist.

Those with skill in the art will readily see that the disclosed cooling system may be arranged in a variety of different ways without deviating from the teachings of the invention. Therefore, all embodiments contemplated have not been shown in complete detail. Other embodiments may be developed without departing from the spirit of the invention or from the scope of the claims.

We claim:

1. A cooling apparatus for a rotating electrical machine having a housing comprising:

(a) a rotor and at least one stator inside the housing;

(b) a rotor shaft extending through the rotor, wherein the rotor shaft includes an integral rotating heat pipe having a generally cylindrically shaped internal vapor cavity, an evaporator section inside the rotor and a condenser section extending outside the rotor and housing;

(c) a vaporizable liquid disposed inside the vapor cavity;

(d) a sealed chamber surrounding the condenser section;

(e) an inlet to the sealed chamber for receiving liquid coolant;

(f) attached to the inlet on the inside of the sealed chamber, at least one spray nozzle for spraying liquid coolant onto the condenser end;

(g) an outlet from the sealed chamber for removing liquid coolant from the sealed chamber;

(h) a preheater for preheating liquid coolant before it enters the inlet to the sealed chamber, wherein the preheater includes a coolant path through a stator.

2. The cooling apparatus according to claim 1, wherein the sealed chamber is partially formed by the outside of the electrical machine housing to become an integral part of the housing.

3. The cooling apparatus according to claim 1, further comprising a supply of liquid coolant wherein the liquid coolant is jet fuel.

* * * * *